United States Patent
Sonezaki et al.

(10) Patent No.: US 7,183,004 B2
(45) Date of Patent: Feb. 27, 2007

(54) COATING COMPOSITION AND RESIN PRODUCT HAVING LIGHT TRANSMITTING PROPERTY

(75) Inventors: Hizashi Sonezaki, Sabae (JP); Masanori Washida, Sabae (JP)

(73) Assignee: Asahi Lite Optical Co., Ltd., Fukui (JP)

( * ) Notice: Subject to any disclaimer, the term of this patent is extended or adjusted under 35 U.S.C. 154(b) by 0 days.

(21) Appl. No.: 10/541,293

(22) PCT Filed: Aug. 26, 2004

(86) PCT No.: PCT/JP2004/012290

§ 371 (c)(1), (2), (4) Date: Aug. 3, 2005

(87) PCT Pub. No.: WO2005/023946

PCT Pub. Date: Mar. 17, 2005

(65) Prior Publication Data

US 2006/0127676 A1 Jun. 15, 2006

(30) Foreign Application Priority Data

Sep. 4, 2003 (JP) .............................. 2003-312782

(51) Int. Cl.
*B32B 27/06* (2006.01)
*C09D 5/00* (2006.01)

(52) U.S. Cl. .............. 428/412; 106/287.1; 106/287.13; 106/287.14; 106/287.16

(58) Field of Classification Search ............ 106/287.1, 106/287.13, 287.14, 287.16; 428/412
See application file for complete search history.

(56) References Cited

U.S. PATENT DOCUMENTS 4,741,961 A 5/1988 Frisch et al.
6,177,138 B1 * 1/2001 Sawaragi et al. ........... 427/387
2004/0013976 A1 * 1/2004 Fujimoto et al. ...... 430/270.14
2006/0003164 A1 * 1/2006 Pickett et al. ............... 428/412

FOREIGN PATENT DOCUMENTS

| EP | 0197806 | 10/1986 |
| EP | 0601782 | 6/1994 |
| JP | 5-9434 | 1/1993 |
| JP | 6-73173 | 3/1994 |
| JP | 8-12925 | 1/1996 |
| JP | 8-269393 | 10/1996 |
| JP | 8-269395 | 10/1996 |
| JP | 2001-206710 | 7/2001 |

* cited by examiner

*Primary Examiner*—David M. Brunsman
(74) *Attorney, Agent, or Firm*—Jordan and Hamburg LLP

(57) ABSTRACT

A coating composition having a high adhesion which is capable of forming a cured film on a resin substrate by using one liquid. There is further provided a coating composition which is capable of obtaining a cured film having favorable dyability which is effective to a resin substrate having a poor dyability and, also, capable of suppressing a whitening phenomenon, and a resin product having the coating composition. The coating composition contains (A) component: a polycarbonate diol, (B) component: colloidal particles of a metal oxide, (C) component: a hydrolysate of an organosilane and (D) component: a solvent. The polycarbonate diol functions as an adhesion promoter and is effective in forming the cured film on the resin formed product without applying the pretreatment liquid. Further, since the polycarbonate diol functions also as a dyability imparting agent, the dying performance thereof can be adjusted according to the amount thereof.

5 Claims, No Drawings

COATING COMPOSITION AND RESIN PRODUCT HAVING LIGHT TRANSMITTING PROPERTY

This application is a 371 of PCT/JP04/12290, filed 26 Aug. 2004.

TECHNICAL FIELD

The present invention relates to a coating composition for covering a resin substrate and a resin product, having a light transmitting property, which is applied with a cured film by the coating composition.

BACKGROUND ART

A plastic molded product has advantages such as light weight, impact resistance, dyability and machinability, compared with a product of glass and holds a major position in the field of lenses, particularly, lenses for eyeglasses, lenses for electronic apparatuses and the like. On the other hand, the plastic molded product has drawbacks in abrasion resistance, heat resistance and the like and, then, in order to improve these drawbacks, various types of efforts for improvements or modifications have been exerted. As a method for improving the abrasion resistance, a cured film has ordinarily been applied on a plastic substrate. The cured film ordinarily comprises a coating composition which contains a hydrolysate of an organosilane as a main component; however, when a refractive index thereof is largely different from that of the substrate, an interference fringe comes to be conspicuous to cause an inferior appearance and, for this account, the refractive index is adjusted by allowing fine particles of a metal oxide to be dispersed in the coating composition. In JP-A Nos. 2001-122621 and 2001-123115, a colloidal particle of titanium oxide as a nucleus is coated with a colloidal particle of antimony oxide to modify titanium oxide as the nucleus and, in this case, while a high refractive index which is characteristic of titanium oxide is realized, compatibility of a silane coupling with the hydrolysate and stability which are characteristic of antimony oxide are also realized.

However, even though it was tried to coat such coating composition as described above on the resin substrate and, then, to form a cured film, adhesion was insufficient, and initial adhesion and weathering resistant adhesion were by no means satisfactory for practical use. For this account, in order to impart adhesion, a two step process was necessary such that a pretreatment liquid is applied on the resin substrate and, thereafter, the coating composition was applied. Particularly, the adhesion to a polycarbonate resin substrate was poor and application of the pretreatment liquid was indispensable. Further, as to other characteristics of the polycarbonate resin, it was difficult to be dyed compared with other resins and, when it is required to dye such resins as having poor dyability, it is necessary to change the cured film to be a dyable one.

Further, in JP-A No. 06-256718, disclosed is a cured film composition which adheres to a thermoplastic sheet without being coated with the pretreatment liquid by allowing a caprolactone-based polyester polyol to be contained in the coating composition as an adhesion promoter. However, there was a problem in that this composition was insufficient in adhesion and, when an effective amount of the caprolactone-based polyester polyol for a required adhesion was contained, whitening of a resin-made composite which has been applied with the cured film was conspicuous. Such whitening phenomenon heavily deteriorates characteristics of optical products such as lenses of eyeglasses; therefore, it can not be applied to a product in which the whitening phenomenon is not desirous.

The patent documents as cited herein are as follows:
Patent Document 1: JP-A No. 2001-122621;
Patent Document 2: JP-A No. 2001-123115; and
Patent Document 3: JP-A No. 06-256718.

DISCLOSURE OF THE INVENTION

Problems that the Invention is to Solve

A problem which the present invention is to solve is to provide a coating composition having a high adhesion capable of forming a cured film on a resin substrate by one liquid. Further, another problem to solve is to provide a coating composition capable of obtaining a cured film having a favorable dyability effective for a resin substrate having a poor dyability and, preferably, capable of suppressing a whitening phenomenon of a resin product.

Means for Solving the Problems

A coating composition according to the present invention is a composition comprising the following (A) to (D) components:

(A) component: a polycarbonate diol;

(B) component: colloidal particles of a metal oxide;

(C) component: a hydrolysate of an organosilane; and (D) component: a solvent.

In the above-described coating composition, the (B) component may comprise colloidal particles of oxides of one or two or more types of metals selected from the group consisting of tin, titanium, zirconium, antimony and silicon.

Further, an amount of the (A) component to be contained is preferably from 0.1% by weight to 7% by weight.

A resin product having a light transmitting property is prepared by applying a cured film by the above-described coating composition according to the present invention on a resin substrate.

A polycarbonate resin can be used as the resin substrate of the resin product having a light transmitting property.

Advantage of the Invention

According to the coating composition of the present invention, it is possible to form the cured film by one liquid without applying a pretreatment liquid on the resin substrate. Further, since a dying performance can be adjusted in accordance with an amount of the polycarbonate diol, even if the resin substrate is the polycarbonate resin which is difficult to dye or the like, a resin product having an excellent dying performance can be obtained. Still further, it is possible to suppress the whitening phenomenon by controlling the amount of the polycarbonate diol.

BEST MODE FOR CARRYING OUT THE INVENTION

The term "polycarbonate diol" as used herein means a carbonic acid ester having a linear aliphatic carbonate skeleton and hydroxyl groups at both ends and is ordinarily represented by the following formula:

[Chemical 1]

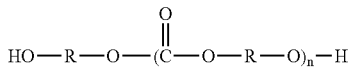

wherein n represents a numeral of 1 or more, preferably from 1 to 30 and, more preferably, from 1 to 20.

The polycarbonate diol works as an adhesion promoter and, by using the polycarbonate diol, it becomes possible to form the cured film on the resin formed product without applying the pretreatment liquid. Further, since the polycarbonate diol functions also as a dyability imparting agent, the dying performance thereof can be adjusted by controlling the amount thereof.

An amount of the polycarbonate diol to be contained is preferably from 0.1% by weight to 12% by weight and, more preferably, 0.1% by weight to 7% by weight. In a case in which the amount thereof to be contained is less than 0.1% by weight, the cured film having a sufficient adhesion can not be formed and the dyability becomes also decreased. In a case in which it is more than 12% by weight, the whitening phenomenon becomes conspicuous, to thereby deteriorate the appearance. When it is 7% by weight or less, the whitening phenomenon is suppressed to such an extent as being tolerable for the lenses for eyeglasses.

For the colloidal particles of the metal oxide, various types of metal oxides can be selected from the viewpoint of the refractive index, stability, dispersibility, abrasion resistance or the like and, then, a sol in which these colloidal particles are dispersed in a solvent can be used. Preferably, a dispersion which contains the colloidal particles of oxides of one or two or more metals selected from among tin, titanium, zirconium, antimony, silicon and tungsten is used. Further, a sol which contains as main components the colloidal particles of titanium oxide, as being a nucleus, coated with antimony pentoxide or a sol which contains as main components the colloidal particles of tin oxide and zirconium oxide, as being nuclei, coated with antimony pentoxide as described in JP-A Nos. 2001-122621 and 2001-123115 as cited herein as the prior art are favorably used.

An amount of the metal oxide to be contained is, in terms of weight including methanol as a dispersing agent, preferably, 20.0 to 60.0% by weight and, in terms of the solid content, preferably, 5.0% by weight to 18.0% by weight.

The hydrolysate of the organosilane to be used in the present invention is an organic silicone compound as described below.

For example, mentioned is a monofunctional silane represented by $R_3SiX$ (R represents an organic group having any one of an alkyl group, a phenyl group, a vinyl group, a methacryloxy group, a mercapto group, an amino group and an epoxy group; and X represents a hydrolyzable group). Specific examples of such monofunctional silanes include trimethyl methoxysilane, triethyl methoxysilane, trimethyl ethoxysilane, triethyl ethoxysilane, triphenyl methoxysilane, diphenyl methyl methoxysilane, phenyl dimethyl methoxysilane, phenyl dimethyl ethoxysilane, vinyl dimethyl methoxysilane, vinyl dimethyl ethoxysilane, γ-acryloxypropyl dimethyl methoxysilane, γ-methacryloxypropyl dimethyl methoxysilane, γ-mercaptopropyl dimethyl methoxysilane, γ-mercaptopropyl dimethyl ethoxysilane, N-β(aminoethyl)γ-aminopropyl dimethyl methoxysilane, γ-aminopropyl dimethyl methoxysilane, γ-aminopropyl dimethyl ethoxysilane, γ-glycidoxypropyl dimethyl methoxysilane, γ-glycidoxypropyl dimethoxyethoxysilane and β-(3,4-epoxycyclohexyl)ethyl dimethyl methoxysilane.

In another case, mentioned is a difunctional silane represented by $R_2SiX_2$. Specific examples of such difunctional silanes include dimethyl dimethoxysilane, diethyl dimethoxysilane, dimethyl diethoxysilane, diethyl diethoxysilane, diphenyl dimethoxysilane, phenyl methyl dimethoxysilane, phenyl methyl diethoxysilane, vinyl methyl dimethoxysilane, vinyl methyl diethoxysilane, γ-acryloxypropyl methyl dimethoxysilane, γ-methacryloxypropyl dimethyl dimethoxysilane, γ-mercaptopropyl methyl dimethoxysilane, γ-mercaptopropyl methyl diethoxysilane, N-β(aminoethyl)γ-aminopropyl methyl dimethoxysilane, γ-aminopropyl methyl dimethoxysilane, γ-aminopropyl methyl diethoxysilane, γ-glycidoxypropyl methyl dimethoxysilane, γ-glycidoxypropyl methyl diethoxysilane and β-(3,4-epoxycyclohexyl)ethyl methyl dimethoxysilane.

In still another case, mentioned is a trifunctional silane represented by $RSiX_3$. Specific examples of such trifunctional silanes include methyl trimethoxysilane, ethyl trimethoxysilane, methyl triethoxysilane, ethyl triethoxysilane, phenyl trimethoxysilane, phenyl triethoxysilane, vinyl trimethoxysilane, vinyl triethoxysilane, vinyl(β-methoxyethoxy)silane, γ-acryloxypropyl trimethoxysilane, γ-methacryloxypropyl trimethoxysilane, γ-mercaptopropyl trimethoxysilane, γ-mercaptopropyl triethoxysilane, N-β(aminoethyl)γ-aminopropyl trimethoxysilane, γ-aminopropyl trimethoxysilane, γ-aminopropyl triethoxysilane, γ-glycidoxypropyl trimethoxysilane, β-glycidoxypropyl trimethoxysilane, γ-glycidoxypropyl trimethoxysilane, β-glycidoxypropyl trimethoxysilane, γ-glycidoxypropyl triethoxysilane, β-glycidoxypropyl triethoxysilane, and β-(3,4-epoxycyclohexyl)ethyl trimethoxysilane.

In further another case, mentioned is a tetrafunctional silane represented by $SiX_4$. Specific examples of such tetrafunctional silanes include tetraethyl orthosilicate and tetramethyl orthosilicate.

Among these compounds, hydrolysates of one or more types of organosilanes are contained in the coating composition according to the present invention. Examples of favorable combinations of two types or more thereof include a combination of methyl trimethoxysilane and γ-glycidoxypropyl trimethoxysilane, a combination of methyl trimethoxysilane and γ-mercaptopropyl trimethoxysilane and a combination of methyl trimethoxysilane and γ-aminopropyl trimethoxysilane.

An amount of the hydrolysate of the organosilane to be contained is, preferably, 10.0% by weight to 40.0% by weight.

As for solvents, mentioned are aqueous and organic solvents. As for such aqueous solvents, mentioned are water and an organic solvent such as methanol containing water. Examples of such organic solvents include aromatic hydrocarbons, chlorinated aromatic hydrocarbons, chlorinated aliphatic hydrocarbons, alcohols, esters, ethers, ketones, glycol ethers, cycloaliphatic hydrocarbons, aliphatic hydrocarbons and mixtures of aliphatic or aromatic hydrocarbons. Due to easy handling and not generating the whitening phenomenon to be caused by attacking the surface of the resin substrate, methanol, methoxypropanol, diacetone alcohol and the like of the alcohol are favorably used.

In the coating composition according to the present invention, other than above-described components, a dyability imparting agent is allowed to be contained. Although the polycarbonate diol itself works as the dyability imparting agent, when the amount thereof is unduly large, the whitening phenomenon is caused. By allowing any of other dyability imparting agents than the polycarbonate diol to be contained, it becomes possible to adjust an effective dying performance which suppresses the whitening phenomenon. Other than such features as described above, it is possible to allow a surfactant to be contained in order to enhance dispersibility of the coating composition and wettability by improving flatness at the time of coating it on the resin substrate, to allow a curing catalyst to be contained in order to promote a curing reaction for realizing a low temperature curing, or to allow an ultraviolet ray absorbing agent or an antioxidant to be contained in order to improve weathering resistance or heat resistance.

Next, the resin product having the light transmitting property will be described. The resin substrate for use in the resin product is not particularly limited and the resin substrate in which an effect according to the present invention particularly remarkably appears is a polycarbonate resin which is a thermoplastic resin incapable of obtaining a sufficient adhesion without the pretreatment liquid. However, other thermoplastic resins such as a polyamide resin, a polyimide resin and a polyolefin resin, or thermosetting resins such as a polyurethane resin and a copolymer of an epoxy resin and an episulfide resin can obtain the effect according to the present invention. As for modes (applications) of the resin product, mentioned are other various types of resin products such as lenses for eyeglasses, lenses for cameras, lenses for electronic apparatuses, resin-made sheets and head-lamp covers for automobiles.

Hereinafter, the present invention is more specifically described with reference to embodiments; however, it is not limited to these embodiments.

As described in Examples 1 to 12 and Comparative Examples 1 to 6 below, a cured film was formed by applying each coating composition on plastic lenses for eyeglasses made of the polycarbonate resin. Thereafter, an interference fringe, an appearance, adhesion, hardness and dyability were evaluated.

EXAMPLE 1

300 g of a complex metal oxide sol comprising tin oxide, titanium oxide, zirconium oxide and antimony pentoxide (solid content: 25%; methanol dispersion sol; manufactured by Nissan Chemical Industries, Ltd.; and trade mark: ®SUNCOLLOID HIT-321M1) was put in a flask after weighing. 140 g of distilled water was added to the sol while stirring. Next, 63 g of methyl trimethoxysilane and 175 g of γ-glycidoxypropyl trimethoxysilane were gradually added to the thus-water-added sol. After such addition was completed, the resultant mixture was stirred for further 30 minutes. Thereafter, while stirring the mixture, 50 g of tetraethoxysilane (manufactured by Colcoat Co. Ltd.; trade mark: ETHYLSILICATE 28P) was added and, then, 47 g of methoxypropanol and 80 g of methanol were added thereto. Further, after 29 g of acetyl acetone aluminum was added to the resultant mixture as a curing catalyst, the resultant mixture was stirred for one hour. Subsequently, 110 g of a polycarbonate diol (manufactured by Daicel Chemical Industries, Ltd.; trade mark: ®PRACCEL CD205PL), and 0.4 g of a silicone-type surfactant (manufactured by Dow Corning Asia Ltd.; trade mark: ®PAINTUD 32) and 0.2 g of another silicone-type surfactant (manufactured by Dow Corning Asia Ltd.; trade mark: ®DOW CORNING 57 ADDITIVE) each as a flow controlling agent were added to the mixture and, then, stirred for one hour. The resultant mixture was ripened for 48 hours at room temperature. Plastic lenses for eyeglasses made of a polycarbonate resin were prepared and, then, the resultant mixture was applied on the thus-prepared lenses by a dipping method and, thereafter, heat-cured for one hour and 30 minutes at 100 to 150° C.

EXAMPLE 2

300 g of a complex metal oxide sol comprising tin oxide, titanium oxide, zirconium oxide and antimony pentoxide (solid content: 25%; methanol dispersion sol; manufactured by Nissan Chemical Industries, Ltd.; and trade mark: ®SUNCOLLOID HIT-321M1) was put in a flask after weighing. 140 g of distilled water was added to the sol while stirring. Next, 63 g of methyl trimethoxysilane and 175 g of γ-glycidoxypropyl trimethoxysilane were gradually added to the thus-water-added sol. After such addition was completed, the resultant mixture was stirred for further 30 minutes. Thereafter, while stirring the mixture, 50 g of tetraethoxysilane (manufactured by Colcoat Co. Ltd.; trade mark: ETHYLSILICATE 28P) was added and, then, 167 g of methoxypropanol was added thereto. Further, after 29 g of acetyl acetone aluminum was added to the resultant mixture as a curing catalyst, the resultant mixture was stirred for one hour. Subsequently, 70 g of a polycarbonate diol (manufactured by Daicel Chemical Industries, Ltd.; trademark: ®PRACCEL CD205PL), and 0.4 g of a silicone-type surfactant (manufactured by Dow Corning Asia Ltd.; trade mark: ®PAINTUD 32) and 0.2 g of another silicone-type surfactant (manufactured by Dow Corning Asia Ltd.; trade mark: ®DOW CORNING 57 ADDITIVE) each as a flow controlling agent were added to the mixture and, then, stirred for one hour. The resultant mixture was ripened for 48 hours at room temperature. The same plastic lenses for eyeglasses made of a polycarbonate resin as in Example 1 were prepared and, then, the resultant mixture was applied on the thus-prepared lenses by a dipping method and, thereafter, heat-cured for one hour and 30 minutes at 100 to 150° C.

EXAMPLE 3

A coating composition having the same components as those in Example 2 except for using a diacetone alcohol in place of the methoxypropanol was prepared by using the same method as that in Example 2. The thus-prepared coating composition was applied on the same lenses made of polycarbonate resin as in Example 1 and, then, cured.

EXAMPLE 4

300 g of a complex metal oxide sol comprising tin oxide, titanium oxide, zirconium oxide and antimony pentoxide (solid content: 25%; methanol dispersion sol; manufactured by Nissan Chemical Industries, Ltd.; and trade mark: ®SUNCOLLOID HIT-321M1) was put in a flask after weighing. 119 g of distilled water was added to the sol while stirring. Next, 63 g of methyl trimethoxysilane and 175 g of γ-glycidoxypropyl trimethoxysilane were gradually added to the thus-water-added sol. After such addition was completed, the resultant mixture was stirred for further 30 minutes. Thereafter, while stirring the mixture, 50 g of tetraethoxysilane (manufactured by Colcoat Co. Ltd.; trade mark: ETHYLSILICATE 28P) was added and, then, 238 g of diacetone alcohol was added thereto. Further, after 29 g of acetyl acetone aluminum was added to the resultant mixture as a curing catalyst, the resultant mixture was stirred for one hour. Subsequently, 20 g of a polycarbonate diol (manufactured by Daicel Chemical Industries, Ltd.; trade mark: ®PRACCEL CD205PL), and 0.4 g of a silicone-type surfactant (manufactured by Dow Corning Asia Ltd.; trade mark: ®PAINTUD 32) and 0.2 g of another silicone-type surfactant (manufactured by Dow Corning Asia Ltd.; trade mark: ®DOW CORNING 57 ADDITIVE) each as a flow controlling agent were added to the mixture and, then, stirred for one hour. The resultant mixture was ripened for 48 hours at room temperature. The same plastic lenses for eyeglasses made of a polycarbonate resin as in Example 1 were prepared and, then, the resultant mixture was applied on the thus-prepared lenses by a dipping method and, thereafter, heat-cured for one hour and 30 minutes at 100 to 150° C.

EXAMPLE 5

330 g of a complex metal oxide sol comprising tin oxide, zirconium oxide, antimony pentoxide and silicon dioxide (solid content: 30%; methanol dispersion sol; manufactured by Nissan Chemical Industries, Ltd.; and trade mark: ®SUNCOLLOID HX-305M5) was put in a flask after weighing. 119 g of distilled water was added to the sol while stirring. Next, 63 g of methyl trimethoxysilane and 175 g of γ-glycidoxypropyl trimethoxysilane were gradually added to the thus-water-added sol. After such addition was completed, the resultant mixture was stirred for further 30 minutes. Thereafter, while stirring the mixture, 10 g of acetyl acetone aluminum was added thereto as a curing catalyst and, then, stirred for one hour. Next, 50 g of tetraethoxysilane (manufactured by Colcoat Co. Ltd.; trade mark: ETHYLSILICATE 28P) was added and, then, 227 g of diacetone alcohol was added to the resultant mixture. Subsequently, 20 g of a polycarbonate diol (manufactured by Daicel Chemical Industries, Ltd.; trade mark: ®PRACCEL CD205PL), and 0.4 g of a silicone-type surfactant (manufactured by Dow Corning Asia Ltd.; trade mark: ®PAINTUD 32) and 0.2 g of another silicone-type surfactant (manufactured by Dow Corning Asia Ltd.; trade mark: ®DOW CORNING 57 ADDITIVE) each as a flow controlling agent were added to the mixture and, then, stirred for one hour. The resultant mixture was ripened for 48 hours at room temperature. The same plastic lenses for eyeglasses made of a polycarbonate resin as in Example 1 were prepared and, then, the resultant mixture was applied on the thus-prepared lenses by a dipping method and, thereafter, heat-cured for one hour and 30 minutes at 100 to 150° C.

EXAMPLE 6

370 g of a complex metal oxide sol comprising tin oxide, zirconium oxide, antimony pentoxide and silicon dioxide (solid content: 30%; methanol dispersion sol; manufactured by Nissan Chemical Industries, Ltd.; and trade mark: ®SUNCOLLOID HX-305M5) was put in a flask after weighing. 50 g of distilled water was added to the sol while stirring. Next, 42 g of methyl trimethoxysilane and 117 g of γ-glycidoxypropyl trimethoxysilane were gradually added to the thus-water-added sol. After such addition was completed, the resultant mixture was stirred for further 30 minutes. Thereafter, while stirring the mixture, 100 g of tetraethoxysilane (manufactured by Colcoat Co. Ltd.; trade mark: ETHYLSILICATE 28P) was added and, then, 222 g of diacetone alcohol and 44 g of methanol were added thereto. Further, 29 g of acetyl acetone aluminum was added to the mixture as a curing catalyst and, then, stirred for one hour. Subsequently, 20 g of a polycarbonate diol (manufactured by Daicel Chemical Industries, Ltd.; trademark: ®PRACCEL CD205PL), and 0.4 g of a silicone-type surfactant (manufactured by Dow Corning Asia Ltd.; trade mark: ®PAINTUD 32) and 0.2 g of another silicone-type surfactant (manufactured by Dow Corning Asia Ltd.; trade mark: ®DOW CORNING 57 ADDITIVE) each as a flow controlling agent were added to the mixture and, then, stirred for one hour. The resultant mixture was ripened for 48 hours at room temperature. The same plastic lenses for eyeglasses made of a polycarbonate resin as in Example 1 were prepared and, then, the resultant mixture was applied on the thus-prepared lenses by a dipping method and, thereafter, heat-cured for one hour and 30 minutes at 100 to 150° C.

EXAMPLE 7

370 g of a complex metal oxide sol comprising tin oxide, zirconium oxide, antimony pentoxide and silicon dioxide (solid content: 30%; methanol dispersion sol; manufactured by Nissan Chemical Industries, Ltd.; and trade mark: ®SUNCOLLOID HX-305M5) was put in a flask after weighing. 50 g of distilled water was added to the sol while stirring. Next, 42 g of methyl trimethoxysilane and 117 g of γ-glycidoxypropyl trimethoxysilane were gradually added to the thus-water-added sol. After such addition was completed, the resultant mixture was stirred for further 30 minutes. Thereafter, while stirring the mixture, 90 g of tetraethoxysilane (manufactured by Colcoat Co. Ltd.; trade mark: ETHYLSILICATE 28P) was added and, then, 222 g of diacetone alcohol and 44 g of methanol were added thereto. Further, 29 g of acetyl acetone aluminum was added to the mixture as a curing catalyst and, then, stirred for one hour. Subsequently, 30 g of a polycarbonate diol (manufactured by Daicel Chemical Inds., Ltd.; trade mark: ®PRACCEL CD205PL), and 0.4 g of a silicone-type surfactant (manufactured by Dow Corning Asia Ltd.; trade mark: ®PAINTUD 32) and 0.2 g of another silicone-type surfactant (manufactured by Dow Corning Asia Ltd.; trade mark: ®DOW CORNING 57 ADDITIVE) each as a flow controlling agent were added to the mixture and, then, stirred for one hour. The resultant mixture was ripened for 48 hours at room temperature. The same plastic lenses for eyeglasses made of a polycarbonate resin as in Example 1 were prepared and, then, the resultant mixture was applied on the thus-prepared lenses by a dipping method and, thereafter, heat-cured for one hour and 30 minutes at 100 to 150° C.

EXAMPLE 8

370 g of a complex metal oxide sol comprising tin oxide, zirconium oxide, antimony pentoxide and silicon dioxide (solid content: 30%; methanol dispersion sol; manufactured by Nissan Chemical Industries, Ltd.; and trade mark: ®SUNCOLLOID HX-305M5) was put in a flask after weighing. 50 g of distilled water was added to the sol while stirring. Next, 63 g of methyl trimethoxysilane and 175 g of γ-glycidoxypropyl trimethoxysilane were gradually added to the thus-water-added sol. After such addition was completed, the resultant mixture was stirred for further 30 minutes. Thereafter, while stirring the mixture, 222 g of diacetone alcohol and 44 g of methanol were added thereto. Further, 29 g of acetyl acetone aluminum was added to the resultant mixture as a curing catalyst and, then, stirred for one hour. Subsequently, 41 g of a polycarbonate diol (manufactured by Daicel Chemical Industries, Ltd.; trade mark: ®PRACCEL CD205PL), and 0.4 g of a silicone-type surfactant (manufactured by Dow Corning Asia Ltd.; trade mark: ®PAINTUD 32) and 0.2 g of another silicone-type surfactant (manufactured by Dow Corning Asia Ltd.; trade mark: ®DOW CORNING 57 ADDITIVE) each as a flow controlling agent were added to the mixture and, then, stirred for one hour. The resultant mixture was ripened for 48 hours at room temperature. The same plastic lenses for eyeglasses made of a polycarbonate resin as in Example 1 were prepared and, then, the resultant mixture was applied on the thus-prepared lenses by a dipping method and, thereafter, heat-cured for one hour and 30 minutes at 100 to 150° C.

EXAMPLE 9

36.00 g of methyl trimethoxysilane and 4.00 g of distilled water were mixed with each other and, then, put in a flask, and 81.50 g of γ-glycidoxypropyl trimethoxysilane and 28.50 g of distilled water were mixed with each other and, then, put in another flask and both of the resultant mixtures were each individually stirred for 5 hours or more and kept aside. 250.0 g of a complex metal oxide sol comprising tin oxide, zirconium oxide, antimony pentoxide and silicon dioxide (solid content: 30%; methanol dispersion sol; manufactured by Nissan Chemical Industries, Ltd.; and trade mark: ®SUNCOLLOID HX-305M5) was put in still another flask after weighing and, then, while stirring, added with 38.1 g of the thus-kept aside methyl trimethoxysilane which has been hydrolyzed by stirring and 105.9 g of the thus-kept aside γ-glycidoxypropyl trimethoxysilane which has been hydrolyzed by stirring. Thereafter, while stirring the resultant mixture, 80.5 g of methoxypropanol was added thereto. Further, 5.0 g of acetyl acetone aluminum was added to the resultant mixture as a curing catalyst and, then, stirred for one hour. Subsequently, 10.0 g of polyethylene glycol monomethacrylate (manufactured by NOF Corporation; trade mark: ®BLEMMER PE200) was added to the resultant mixture. Next, 7.5 g of a polycarbonate diol (manufactured by Daicel Chemical Industries, Ltd.; trade mark: ®PRACCEL CD205PL), and 0.2 g of a silicone-type surfactant (manufactured by Dow Corning Asia Ltd.; trade mark: ®PAINTUD 32) and 0.1 g of another silicone-type surfactant (manufactured by Dow Corning Asia Ltd.; trade mark: ®DOW CORNING 57 ADDITIVE) each as a flow controlling agent were added to the mixture and, then, stirred for one hour. The resultant mixture was ripened for 48 hours at room temperature. The same plastic lenses for eyeglasses made of a polycarbonate resin as in Example 1 were prepared and, then, the resultant mixture was applied on the thus-prepared lenses by a dipping method and, thereafter, heat-cured for one hour and 30 minutes at 100 to 150° C.

EXAMPLE 10

71 g of methyl trimethoxysilane and 7 g of distilled water were mixed with each other and, then, put in a flask, and 160 g of γ-glycidoxypropyl trimethoxysilane and 55 g of distilled water were mixed with each other and, then, put in another flask and both of the resultant mixtures were each individually stirred for one night or longer and kept aside. 370 g of a complex metal oxide sol comprising tin oxide, zirconium oxide, antimony pentoxide and silicon dioxide (solid content: 30%; methanol dispersion sol; manufactured by Nissan Chemical Industries, Ltd.; and trade mark: ®SUNCOLLOID HX-305M5) was put in still another flask after weighing and, then, added with 76 g of the thus-kept aside methyl trimethoxysilane which has been hydrolyzed by stirring for one night and 212 g of the thus-kept aside γ-glycidoxypropyl trimethoxysilane which has been hydrolyzed by stirring for one night. Thereafter, while stirring the resultant mixture, 277 g of diacetone alcohol was added thereto. Further, 29 g of acetyl acetone aluminum was added to the resultant mixture as a curing catalyst and, then, stirred for one hour. Subsequently, 30 g of a polycarbonate diol (manufactured by Daicel Chemical Industries, Ltd.; trade mark: ®PRACCEL CD205PL), and 0.4 g of a silicone-type surfactant (manufactured by Dow Corning Asia Ltd.; trade mark: ®PAINTUD 32) and 0.2 g of another silicone-type surfactant (manufactured by Dow Corning Asia Ltd.; trade mark: ®DOW CORNING 57 ADDITIVE) each as a flow controlling agent were added to the mixture and, then, stirred for one hour. The resultant mixture was ripened for 48 hours at room temperature. The same plastic lenses for eyeglasses made of a polycarbonate resin as in Example 1 were prepared and, then, the resultant mixture was applied on the thus-prepared lenses by a dipping method and, thereafter, heat-cured for one hour and 30 minutes at 100 to 150° C.

EXAMPLE 11

71 g of methyl trimethoxysilane and 7 g of distilled water were mixed with each other and, then, put in a flask, and 162 g of γ-glycidoxypropyl trimethoxysilane and 51 g of distilled water were mixed with each other and, then, put in another flask and both of the resultant mixtures were each individually stirred for one night or longer and kept aside. Then, 76 g of the thus-kept aside methyl trimethoxysilane which has been hydrolyzed by stirring for one night and 212 g of the thus-kept aside γ-glycidoxypropyl trimethoxysilane which has been hydrolyzed by stirring for one night were mixed with each other. Thereafter, while stirring the resultant mixture, 370 g of a complex metal oxide sol comprising tin oxide, zirconium oxide, antimony pentoxide and silicon dioxide (solid content: 30%; methanol dispersion sol; manufactured by Nissan Chemical Industries, Ltd.; and trade mark: ®SUNCOLLOID HX-305M5) was added thereto. Then, while stirring the resultant mixture, 292 g of diacetone alcohol was added thereto. Further, 29 g of acetyl acetone aluminum was added to the resultant mixture as a curing catalyst and, then, stirred for one hour. Subsequently, 15 g of a polycarbonate diol (manufactured by Daicel Chemical Industries, Ltd.; trade mark: ®PRACCEL CD205PL), and 0.4 g of a silicone-type surfactant (manufactured by Dow Corning Asia Ltd.; trade mark: ®PAINTUD 32) and 0.2 g of another silicone-type surfactant (manufactured by Dow Corning Asia Ltd.; trade mark: ®DOW CORNING 57 ADDITIVE) each as a flow controlling agent were added to the mixture and, then, stirred for one hour. The resultant mixture was ripened for 48 hours at room temperature. The same plastic lenses for eyeglasses made of a polycarbonate resin as in Example 1 were prepared and, then, the resultant mixture was applied on the thus-prepared lenses by a dipping method and, thereafter, heat-cured for one hour and 30 minutes at 100 to 150° C.

EXAMPLE 12

36.00 g of methyl trimethoxysilane and 4.00 g of distilled water were mixed with each other and, then, put in a flask, and 81.50 g of γ-glycidoxypropyl trimethoxysilane and 28.50 g of distilled water were mixed with each other and, then, put in another flask and both of the resultant mixtures were each individually stirred for 5 hours or more and kept aside. 250.0 g of a complex metal oxide sol comprising tin oxide, zirconium oxide, antimony pentoxide and silicon dioxide (solid content: 30%; methanol dispersion sol; manufactured by Nissan Chemical Industries, Ltd.; and trade mark: ®SUNCOLLOID HX-305M5) was put in still another flask after weighing and, then, while stirring, added with 38.1 g of the thus-kept aside methyl trimethoxysilane which has been hydrolyzed by stirring and 105.9 g of the thus-kept aside γ-glycidoxypropyl trimethoxysilane which has been hydrolyzed by stirring. Thereafter, while stirring the resultant mixture, 86.1 g of methoxypropanol was added thereto. Further, 5.0 g of acetyl acetone aluminum was added to the resultant mixture as a curing catalyst and, then, stirred for one hour. Subsequently, 10.0 g of polyethylene glycol monomethacrylate (manufactured by NOF Corporation; trade mark: ®BLEMMER PE200) was added to the resultant mixture. Next, 1.9 g of a polycarbonate diol (manufactured by Asahi Chemical Corporation; trade mark: ®ASAHI KASEI PCDL T5650j), and 0.2 g of a silicone-type surfactant (manufactured by Dow Corning Asia Ltd.; trade mark: ®PAINTUD 32) and 0.1 g of another silicone-type surfactant (manufactured by Dow Corning Asia Ltd.; trade mark: ®DOW CORNING 57 ADDITIVE) each as a flow controlling agent were added to the mixture and, then, stirred for one hour. The resultant mixture was ripened for 48 hours at room temperature. The same plastic lenses for eyeglasses made of a polycarbonate resin as in Example 1 were prepared and, then, the resultant mixture was applied on the thus-prepared lenses by a dipping method and, thereafter, heat-cured for one hour and 30 minutes at 100 to 150° C.

COMPARATIVE EXAMPLE 1

300 g of a complex metal oxide sol comprising tin oxide, titanium oxide, zirconium oxide and antimony pentoxide (solid content: 25%; methanol dispersion sol; manufactured by Nissan Chemical Industries, Ltd.; and trade mark: ®SUNCOLLOID HIT-321M1) was put in a flask after weighing. 140 g of distilled water was added to the sol while stirring. Next, 63 g of methyl trimethoxysilane and 175 g of γ-glycidoxypropyl trimethoxysilane were gradually added to the thus-water-added sol. After such addition was completed, the resultant mixture was stirred for further 30 minutes. Thereafter, while stirring the mixture, 50 g of tetraethoxysilane (manufactured by Colcoat Co. Ltd.; trade mark: ETHYLSILICATE 28P) was added and, then, 140 g of methoxypropanol and 77 g of methanol were added thereto. Further, after 29 g of acetyl acetone aluminum was added to the resultant mixture as a curing catalyst, the resultant mixture was stirred for one hour. Subsequently, 20 g of a polycaprolactone triol, and 0.4 g of a silicone-type surfactant (manufactured by Dow Corning Asia Ltd.; trade mark: ®PAINTUD 32) and 0.2 g of another silicone-type surfactant (manufactured by Dow Corning Asia Ltd.; trade mark: ®DOW CORNING 57 ADDITIVE) each as a flow controlling agent were added to the mixture and, then, stirred for one hour. The resultant mixture was ripened for 48 hours at room temperature. Plastic lenses for eyeglasses made of a polycarbonate resin were prepared and, then, the resultant mixture was applied on the thus-prepared lenses by a dipping method and, thereafter, heat-cured for one hour and 30 minutes at 100 to 150° C.

COMPARATIVE EXAMPLE 2

A coating composition having the same components as those in Comparative Example 1 except for using a polycaprolactone polyol (having 4 or more hydroxyl groups) in place of the polycaprolactone triol was prepared by using the same method as that in Comparative Example 1. The thus-prepared coating composition was applied on the same lenses made of polycarbonate resin as in Example 1 and, then, cured.

COMPARATIVE EXAMPLE 3

300 g of a complex metal oxide sol comprising tin oxide, titanium oxide, zirconium oxide and antimony pentoxide (solid content: 25%; methanol dispersion sol; manufactured by Nissan Chemical Industries, Ltd.; and trade mark: ®SUNCOLLOID HIT-321M1) was put in a flask after weighing. 140 g of distilled water was added to the sol while stirring. Next, 63 g of methyl trimethoxysilane and 175 g of γ-glycidoxypropyl trimethoxysilane were gradually added to the thus-water-added sol. After such addition was completed, the resultant mixture was stirred for further 30 minutes. Thereafter, while stirring the mixture, 50 g of tetraethoxysilane (manufactured by Colcoat Co. Ltd.; trade mark: ETHYLSILICATE 28P) was added and, then, 47 g of methoxypropanol and 80 g of methanol were added thereto. Further, after 29 g of acetyl acetone aluminum was added to the resultant mixture as a curing catalyst, the resultant mixture was stirred for one hour. Subsequently, 110 g of a polycaprolactone triol, and 0.4 g of a silicone-type surfactant (manufactured by Dow Corning Asia Ltd.; trade mark: ®PAINTUD 32) and 0.2 g of another silicone-type surfactant (manufactured by Dow Corning Asia Ltd.; trade mark: ®DOW CORNING 57 ADDITIVE) each as a flow controlling agent were added to the mixture and, then, stirred for one hour. The resultant mixture was ripened for 48 hours at room temperature. Plastic lenses for eyeglasses made of a polycarbonate resin were prepared and, then, the resultant mixture was applied on the thus-prepared lenses by a dipping method and, thereafter, heat-cured for one hour and 30 minutes at 100 to 150° C.

COMPARATIVE EXAMPLE 4

A coating composition having the same components as those in Comparative Example 3 except for using an aliphatic polyester dios in place of the polycaprolactone triol was prepared by using the same method as that in Comparative Example 3. The thus-prepared coating composition was applied on the same lenses made of polycarbonate resin as in Example 1 and, then, cured.

COMPARATIVE EXAMPLE 5

A coating composition having the same components as those in Comparative Example 3 except for using a polycaprolactone diol in place of the polycaprolactone triol was prepared by using the same method as that in Comparative Example 3. The thus-prepared coating composition was applied on the same lenses made of polycarbonate resin as in Example 1 and, then, cured.

COMPARATIVE EXAMPLE 6

300 g of a complex metal oxide sol comprising tin oxide, titanium oxide, zirconium oxide and antimony pentoxide (solid content: 25%; methanol dispersion sol; manufactured by Nissan Chemical Industries, Ltd.; and trade mark: ®SUNCOLLOID HIT-321M1) was put in a flask after weighing. 140 g of distilled water was added to the sol while stirring. Next, 63 g of methyl trimethoxysilane and 175 g of γ-glycidoxypropyl trimethoxysilane were gradually added to the thus-water-added sol. After such addition was completed, the resultant mixture was stirred for further 30 minutes. Thereafter, while stirring the mixture, 50 g of tetraethoxysilane (manufactured by Colcoat Co. Ltd.; trade mark: ETHYLSILICATE 28P) was added and, then, 167 g of methoxypropanol was added thereto. Further, after 29 g of acetyl acetone aluminum was added to the resultant mixture as a curing catalyst, the resultant mixture was stirred for one hour. Subsequently, 70 g of a polycaprolactone diol, and 0.4 g of a silicone-type surfactant (manufactured by Dow Corning Asia Ltd.; trademark: ®PAINTUD 32) and 0.2 g of another silicone-type surfactant (manufactured by Dow Corning Asia Ltd.; trade mark: ®DOW CORNING 57 ADDITIVE) each as a flow controlling agent were added to the mixture and, then, stirred for one hour. The resultant mixture was ripened for 48 hours at room temperature. Plastic lenses for eyeglasses made of a polycarbonate resin were prepared and, then, the resultant mixture was applied on the thus-prepared lenses by a dipping method and, thereafter, heat-cured for one hour and 30 minutes at 100 to 150° C.

Evaluations of films derived from coating compositions of Examples 1 to 12 and Comparative Examples 1 to 6 are shown in Table 1 described below.

Since the coating composition of Comparative Example 4 was not sufficiently cured even by being heated for one and half hour and a surface of a lens was sticky and, accordingly, it was unable to evaluate the film thereof.

(3) Adhesion:

Adhesion was evaluated by a crosshatch test. Numerals in Table 1 show the number of pieces which were not confirmed of peeling-off thereof out of 100 pieces in a checkerboard pattern. An indication of "-" denotes incapability of evaluation.

(4) SW Hardness

A cured surface was rubbed by using steel wool #0000 and, then, an extent of scratches caused was evaluated. Such rubbing was performed 10 times in reciprocation under a load of 500 g. Evaluation criteria are as follows:

A: No scratch was confirmed at all;
B: A slight scratch was confirmed;
C: A conspicuous scratch was confirmed;
D: Many conspicuous scratches were confirmed;
E: Scratches in a strip state were confirmed; and
-: Unable to evaluate.

(5) Dyability

Lenses were dyed and, then, an entire-light-ray transmittance was measured, to thereby evaluate a dyed density in terms of numerals. An indication "-" denotes either being unable to evaluate or, due to adhesion of 0/100, evaluation of dyability can not be performed.

TABLE 1

|  | Interference fringe | Appearance | Adhesion | SW hardness | Dyability |
|---|---|---|---|---|---|
| Example 1 | ○ | Δ | 50/100 | D | 56.5 |
| Example 2 | ○ | Δ | 100/100 | C | 52.1 |
| Example 3 | ○ | Δ | 100/100 | C | 53.0 |
| Example 4 | ○ | ○ | 100/100 | A | 17.9 |
| Example 5 | ○ | ○ | 100/100 | B | 18.4 |
| Example 6 | ○ | ○ | 100/100 | D | 17.6 |
| Example 7 | ○ | ○ | 100/100 | C | 31.7 |
| Example 8 | ○ | Δ | 100/100 | C | 48.8 |
| Example 9 | ○○ | ○ | 100/100 | B | 40.6 |
| Example 10 | ○ | ○ | 100/100 | B | 41.1 |
| Example 11 | ○ | ○ | 100/100 | B | 19.5 |
| Example 12 | ○○ | Δ | 100/100 | B | 38.5 |
| Comparative Example 1 | ○ | ○ | 0/100 | B | — |
| Comparative Example 2 | ○ | ○ | 0/100 | C | — |
| Comparative Example 3 | ○ | ○ | 0/100 | D | — |
| Comparative Example 4 | — | — | — | — | — |
| Comparative Example 5 | ○ | x | 0/100 | E | — |
| Comparative Example 6 | ○ | ○ | 0/100 | C | — |

An evaluation method in Table 1 is as described below.

(1) Interference Fringe:

An interference fringe was confirmed by means of a visual inspection by using a light source for inspection (National Palux; triple wavelength-type daylight-white luminescence, 15 W). Evaluation criteria are as follows:

00: Very few interference fringes were noticed;
0: An interference fringe was in a permissible extent for lenses for eyeglasses; and
-: Unable to evaluate.

(2) Appearance:

An extent of whitening of lenses was confirmed by means of a visual inspection. Evaluation criteria are as follows:

0: Whitening was not confirmed;
Δ: Slight whitening was confirmed;
x: Whitening conspicuously appeared; and
-: Unable to evaluate.

From the above-described results, it has been found that Examples in which a polycarbonate diol is allowed to be contained forms a cured film having better adhesion than Comparative Examples in which a polycaprolactone diol, a polycaprolactone triol, or a polycaprolactone polyol (having 4 or more hydroxyl groups) is allowed to be contained. Further, it has also been found that, when the amount of a polycarbonate diol is large, dyability is enhanced. In Example 9, it has been succeeded in decreasing the interference fringe by increasing the amount of the metal oxide sol in the hard coat composition and, then, allowing the refractive index of the cured film to be raised up, to 1.56 which is close to the refractive index of the polycarbonate resin.

INDUSTRIAL APPLICABILITY

A coating composition according to the present invention is applicable for various types of resin products such as lenses for eyeglasses, lenses for cameras, lenses for electronic apparatuses, resin-made sheets and head-lamp covers for automobiles.

The invention claimed is:

1. A coating composition comprising the following (A) to (D) components:
   (A) component: a polycarbonate diol;
   (B) component: colloidal particles of a metal oxide;
   (C) component: a hydrolysate of an organosilane; and
   (D) component: a solvent.

2. The coating composition according to claim 1, wherein the (B) component comprises colloidal particles of oxides of one or two or more types of metals selected from the group consisting of tin, titanium, zirconium, antimony and silicon.

3. The coating composition according to claim 1 or 2, wherein the amount of the (A) component is in the range of from 0.1% by weight to 7% by weight.

4. A resin product having a light transmitting property, wherein a resin substrate is applied with a cured film by the coating composition according to any one of claim 1 or 2.

5. The resin product having the light transmitting property according to claim 4, wherein the resin substrate is a polycarbonate resin.

* * * * *